UNITED STATES PATENT OFFICE.

NAPOLEON PETINOT, OF NEW YORK, N. Y., ASSIGNOR TO THE TITANIUM ALLOY MANUFACTURING COMPANY, OF NEW YORK, N. Y., A CORPORATION OF MAINE.

PROCESS FOR PRODUCING IRON SULFID.

1,169,093. Specification of Letters Patent. Patented Jan. 18, 1916.

No Drawing. Application filed October 21, 1915. Serial No. 57,098.

*To all whom it may concern:*

Be it known that I, NAPOLEON PETINOT, a citizen of the Republic of France, residing at New York city, in the county of New York and State of New York, have invented new and useful Improvements in Processes for Producing Iron Sulfid, of which the following is a specification.

My present invention relates to the manufacture of iron sulfid, *i. e.* ferrous sulfid, and its objects comprise provision of a method comprising novel steps whereby the same may be attained in a more rapid and economical manner, and of better quality, and of more definite composition, than by heretofore practised procedures.

Various so called ferrous sulfid products have, prior to my invention, been produced, and with more or less uncertainty and disadvantage, in a variety of ways, as, for example, by heating together iron filings and sulfur, or even by heating an intimate mixture of iron disulfid and iron, but hitherto the temperatures employed, and the resulting uncertainties, and losses, through vaporization, or oxidation, of the sulfur, have rendered such operations as usually practised in crucibles, or in reverberatory furnaces heated by a reducing flame, too undependable and expensive for ordinary industrial purposes.

I attain the objects of my invention as follows: For the sulfur-contributing ingredient of my charge I use iron pyrites ore, preferably such as contains an amount of silicious, or other impurities sufficient to produce the slag blanket hereinafter described. With such ore I mix such an amount of iron as is indicated, by analysis of the ore, to be required for production therefrom, by chemical reaction, of the utmost possible of iron-sulfid product. This mixture I heat preferably in an electric furnace of the arc type, preferably the well known Siemens furnace, since this is the easiest to operate. When the current is turned on, and as soon as melting begins, the aforesaid impurities immediately fuse and form a slag, which, because of its relatively low specific gravity, immediately rises through and to the surface of the charge, and thus, from the inception to the end of the operation, continuously forms over the sulfurous ingredients and other constituents of the charge, a supernatant protective covering, or blanket, which I have discovered is very efficient in preventing losses of sulfur notwithstanding the unprecedentedly high and correspondingly more efficient temperatures thus rendered for the first time, as I believe, employable in operations to produce iron sulfid on industrial scales of manufacture.

In case pyrites ore containing sufficient of the aforesaid impurities of the kind required to impart proper fusibility, or in amount less than to insure required thickness of the slag blanket, is unattainable, the deficiency may, to a degree, be supplied by additions of sand or other suitable slag-forming substances to the charge. When the charge has been entirely melted, I withdraw the desired final product in any convenient manner, as, for example, by tapping.

By means of my said method, including its high temperature and use of ore, I am enabled to obtain an exceptionally useful product consisting essentially of iron sulfid of definite composition, *i. e.* FeS, and this I accomplish with much less loss of sulfur, and with much greater ease and other economies, than can be the comparatively uncertain, and inferior, iron-sulfid products produced by any previous process known to me.

Having now described my invention, I claim:—

1. The method of producing iron sulfid, which comprises melting together iron and iron pyrites ore containing slag-forming impurities.

2. The method of producing iron sulfid, which comprises melting together iron, iron pyrites ore, and a slag-forming material.

NAPOLEON PETINOT.

Witnesses:
GEORGE W. BAHRENBURG.
PAUL HAASIS.